219-121. SR 6-11-74 OR 3,816,700

United States Patent [19]

Weiner et al.

[11] 3,816,700

[45] June 11, 1974

[54] APPARATUS FOR FACILITATING LASER SCRIBING

[75] Inventors: Myron Jerome Weiner, Los Angeles; Floyd Rufford Pothoven, Hawthorne, both of Calif.; Nolton Clement Johnson, Jr., Bend, Oreg.

[73] Assignee: Union Carbide Corporation, New York, N.Y.

[22] Filed: July 19, 1973

[21] Appl. No.: 380,839

Related U.S. Application Data

[62] Division of Ser. No. 191,434, Oct. 21, 1971, abandoned.

[52] U.S. Cl. .............................. 219/121 L, 269/21

[51] Int. Cl. .............................................. B23k 27/00

[58] Field of Search ................. 219/121 L, 121 LM; 29/DIG. 44, 203 R, 203 P, 203 S, 203 V, 413; 83/6; 269/21, 56, 57; 225/2, 96.5

[56] References Cited

UNITED STATES PATENTS

| | | | |
|---|---|---|---|
| 3,626,141 | 12/1971 | Daly | 219/121 L |
| 3,651,401 | 3/1972 | Cooney | 269/57 |

*Primary Examiner*—J. V. Truhe
*Attorney, Agent, or Firm*—Pastoriza & Kelly

[57] ABSTRACT

A substrate alignment assembly station is provided next to a scribing assembly station for receiving a substrate from the alignment station after alignment for automatic scribing. By this arrangement, a single operator can align a substrate during the period of time a previous substrate is being scribed so that a stack of substrates may be scribed in rapid succession.

4 Claims, 5 Drawing Figures

APPARATUS FOR FACILITATING LASER SCRIBING

This is a division of application Ser. No. 191,434 filed Oct. 21, 1971, now abandoned.

This invention relates generally to scribing substrates and more particularly to an improved apparatus for scribing a stack of substrates which might, by way of example contain microelectronic devices and circuits in rapid succession by automatic laser beam scribing equipment.

BACKGROUND OF THE INVENTION

The term "scribing" is normally defined as cutting partially through a material such as a substrate. By subsequently applying mechanical stresses to the material it can be broken along the scribe lines into individual pieces or dice.

The term "dicing" is normally defined as a cutting completely through of a material such as a substrate thereby separating the material into individual dice in the one operation.

While the present invention will be described with respect to the scribing of substrates, it is to be understood that the principles and operations set forth are equally applicable to dicing of substrates. Accordingly, the term "scribing" as used herein is to be understood as including "scribing" or "dicing."

It is now common practice to form miniature circuits on substrates of semi-conductor type material (e.g. silicon) or dielectric type material (e.g. alumina) separated by "streets" and "avenues." The substrates are then scribed along the streets and avenues and the substrate then fractured along the scribe lines thereby providing a rapid production means for separate circuits and devices.

Heretofore, such scribing has been accomplished by diamond cutting tools or circular saws. More recently, laser beams have been utilized for the scribing operation.

Almost all present day scribing equipment is automatic in operation. Thus, it is only esssential that a substrate to be scribed be precisely aligned in an initial set position relative to a scribing medium such as a laser beam. Thereafter, automated equipment will guide the substrate under the beam for scribing or alternatively move the scribing medium itself across the substrate. Since the "avenues" and "streets" defining the scribing lines on the substrate are fixed in dimension, and are of common distance apart (pitch), once the substrate has been properly initially aligned, it is a simple matter for the automatic equipment to effect a complete scribing of the substrate along the defined paths.

The actual initial alignment of a substrate selected from a stack of substrates to be scribed is a relatively time consuming operation. After such alignment has been completed, the operator then waits while the automatic scribing is carried out. After the scribing is completed, the operator can remove the scribed substrate and then insert a next substrate ih the equipment and proceed with the aligning of this next substrate. After the next substrate has been aligned, the operator will then initiate operation of the automatic scribing equipment, and so forth.

BRIEF DESCRIPTION OF THE PRESENT INVENTION

The present invention seeks to overcome the great loss of time resulting from having to align each substrate prior to scribing of the substrate and thereby speed up production where it is necessary to scribe a complete stack of substrates.

More particularly, the invention contemplates an apparatus wherein an alignment assembly station is provided next to the automatic laser scribing equipment. A first substrate may then be aligned on the alignment assembly station. This substrate is then transferred to the automatic laser scribing equipment and this equipment is then energized to commence the automatic scribing. During the scribing of the first substrate a second substrate is selected and aligned at the alignment station so that after the first substrate has been scribed, the second substrate is ready to be received in the automatic scribing equipment. By repeating these steps with subsequent substrates, a stack of substrates may be scribed very rapidly, one substrate being aligned during the period that the preceeding substrate is being scribed.

More particularly, the system contemplates the provision of first and second substrate mounting plates receivable in first and second holding chucks at the alignment assembly station and laser scribing assembly station respectively. These two stations are located next to each other so that a single operator may select a first substrate from a stack of substrates to be scribed and position this first substrate on the first substrate mounting plate while held in the first holding chuck in a fixed position relative to a viewing microscope. The first substrate is viewed through the microscrope and a street and avenue defining the scribing boundaries are aligned with reference lines in the microscope by manually sliding the substrate beneath the microscope on the first substrate mounting plate. After alignment, the substrate is vacuum sealed or otherwise held to the first substrate mounting plate and the mounting plate and substrate are transferred as a unit to the second holding chuck which is substantially identical to the first holding chuck so that the orientation is maintained. The second holding chuck is movable to a set position relative to a laser beam to be used in scribing the first substrate. The automatic equipment for scribing can then be started and during the scribing of the first substrate a second substrate may be selected from the stack and positioned on the second substrate mounting plate which is then receivable in the first holding chuck. The second substrate is then aligned in the same manner as the first substrate during the time that the first substrate is being scribed so that after scribing of the first substrate the same may be removed from the first substrate mounting plate and the second mounting plate and second substrate placed in the second holding chuck preparatory to scribing. The first substrate mounting plate can then be utilized to receive and enable alignment of a third substrate from the stack, the various steps being repeated until all of the substrates in the stack are scribed.

Since alignment of a substrate can take place during the period of time that the previous substrate is being scribed, there is no loss of time resulting from the alignment operations and production by a single operator is always increased, frequently by a factor of two.

BRIEF DESCRIPTION OF THE DRAWINGS

A better understanding of the invention will be had by now referring to the accompanying drawings in which.

DETAILED DESCRIPTION OF THE INVENTION

Figure 1:
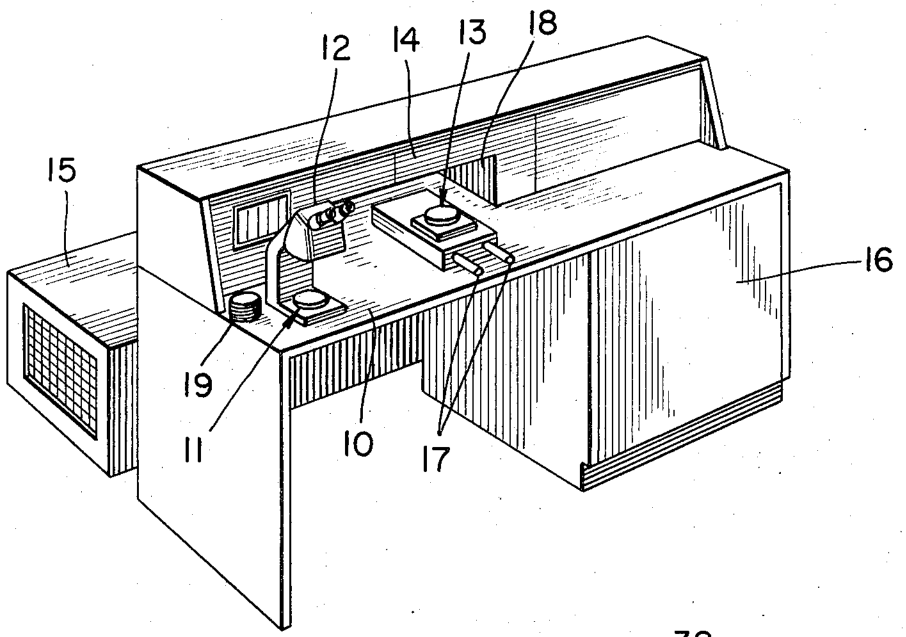
FIG. 1 is a perspective view illustrating an alignment station utilized in conjunction with automatic laser scribing equipment in accord with the present invention.

Referring first to FIG. 1 there is shown a work area surface 10 for a single operator. In this area there is located a substrate alignment assembly station 11 including a viewing microscope 12. Adjacent to the alignment assembly station is a laser scribing assembly station 13 including suitable laser beam generating apparatus within an enclosure 14 together with a power supply 15. The laser scribing station also includes automatic equipment within an enclosure 16 for guiding or moving a substrate to be scribed along guide tracks 17 into an enclosure 18 to an initial set position relative to the laser beam generating apparatus within the enclosure 14. The automatic equipment within the enclosure 16 is programmed to move the substrate to be scribed from its initial set position along a given path so that the scribing of the substrate follows the streets and avenues all in an automatic manner once the equipment is started.

A stack of substrates 19 adjacent the alignment station 11 is shown preparatory to being scribed in accord with the present invention.

Figures 2, 3, 4, 5:
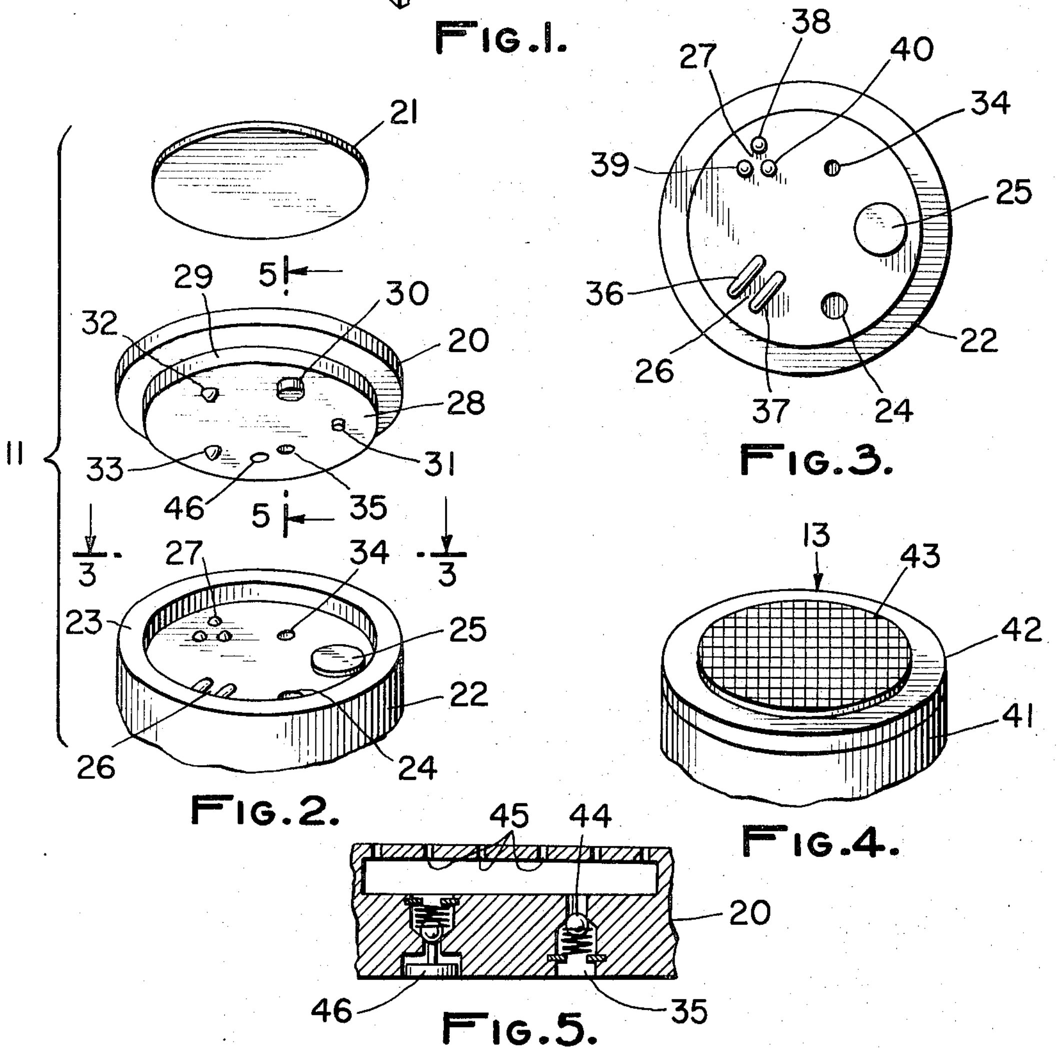
FIG. 2 is an exploded view of a first substrate mounting plate, substrate and holding chuck in accord with the invention.
FIG. 3 is a plan view of the holding chuck taken in the direction of the arrows 3—3 of FIG. 2.
FIG. 4 is a fragmentary perspective view of a second holding chuck with a second substrate mounting plate received therein all associated with the automatic laser scribing equipment.
FIG. 5 is an enlarged fragmentary cross-section of a portion of the first substrate mounting plate taken in the direction of the arrows 5—5 of FIG. 2.

Referring now to FIG. 2 there is shown in detail certain components utilized at the alignment station 11 of FIG. 1. These components include a first substrate mounting plate 20 for receiving on its top surface a fist substrate 21 from the stack of substrates 19. A first holding chuck 22 is arranged to receive the first substrate mounting plate 20 there being provided an annular lip 23 on the first holding chuck defining a receiving area for the plate. This receiving area includes an indexing hole 24 and a kinematic mounting means disposed at the vertices of a triangle as indicated at 25, 26 and 27. This mounting means will be described in greater detail as the description proceeds.

Referring now to the underside of the first substrate mounting plate 20 there is shown an indexing pin 30 for reception in the index hole 24 for generally orienting the plate 20 and first, second and third rounded projections 31, 32 and 33 for co-operation with the kinematic mountings 25, 26 and 27 respectively to orient the plate 20 in an exact consistent position so that repeatability of such positioning is possible.

The first holding chuck and first substrate mounting plate also includes vacuum sealing means for holding a selected substrate such as 21 in an aligned position on top of the plate 20. This vacuum sealing means includes a vacuum coupling end 34 on the first chuck 22 for co-operation with a vacuum hole 35 passing through the mounting plate 20. This vacuum holding means will also be described in greater detail as the description proceeds.

Referring now to FIG. 3, details of the kinematic mounting means are shown. Thus, the first mount 25 is in the form of a flat disc at a given level defining a one point contact for the first rounded projection 31 for the mounting plate 20 of FIG. 2. The second mount comprises a pair of parallel members cylindrically shaped defining a two point contact for a second one of the rounded projections on the plate such as the projection 32 described in FIG. 2. The axes of these cylindrical members 36 and 37 are parallel and radially directed. The third mount includes three members such as balls 38, 39 and 40 defining a three point contact for the third of the rounded projections such as the projection 33 on the mounting plate 20 of FIG. 2. When the mounting plate 20 is received on the first chuck, the indexing pin 30 will be received in the hole 24 to provide a general orientation as described. Thereafter, the rounded projection 31 engages the flat surface 25 defining a level for the plate. Reception of the rounded projection 32 between the cylindrical members 36 and 37 defines an exact angular orientation for the plate while reception of the rounded projection 33 with a three point contact on the elements 38, 39 and 40 exactly positions the plate in translation. Thus, the mounting plate is held relative to the chuck in all six degrees of freedom and extremely accurate repeatability of this positioning is assured.

Referring now to FIG. 4 there is shown a second holding chuck 41 which is identical to the first holding chuck 22. Shown received in the second holding chuck 41 is a second substrate mounting plate 42 having a substrate 43 on its surface properly aligned preparatory to being scribed. As described in FIG. 1, the second holding chuck 41 and co-operating substrate holding plate 42 constitute part of the laser scribing assembly station 13.

FIG. 5 shows in fragmentary cross-section details of the vacuum sealing means described in conjunction with FIG. 2. The second holding chuck 41 and second substrate mounting plate 42 are identical in construction so that description of one will suffice for both. As shown, the hole 35 in the substrate mounting plate 20 includes a check valve 44 so that any vacuum drawn under a substrate seated on the surface of the plate is held. It will be noted that the top surface of the plate includes holes 45 all of which communicate with the hole 35 so that a proper holding by vacuum of the substrate 21 of FIG. 2 is assured. A vacuum release valve 46 may be manually operated to release the vacuum when it is desired to remove the substrate from the top surface of the mounting plate. As an alternative, a flexible vacuum line may be used in place of the check valve 44 to maintain a vacuum.

OPERATION

In operation, a single operator will first select a substrate from the stack 19 of FIG. 1 such as the first substrate 21 shown in FIG. 2. This substrate is then placed on the top surface of the substrate mounting plate 20, this plate in turn being received in the first holding chuck 22. By now viewing the substrate through the microscope 12 of FIG. 1, the operator manually slides the substrate over the top surface of the plate 20 until a "street" and "avenue" are aligned with respect to reference lines in the microscope. Since the reference lines in the microscope are absolutely fixed relative to the first holding chuck 22, alignment of the substrate on the mounting plate 20 will dispose this substrate in a given set position relative to the first chuck.

After the first substrate is aligned, the vacuum sealing means is energized to draw a vacuum under the substrate thereby holding it firmly against the top surface. The check valve 44 described in FIG. 5 prevents back leakage of air to the substrate.

After the alignment step has been completed, the entire substrate mounting plate 20 along with the substrate 21 adhered to the top surface is transferred to the second holding chuck 41 at the scribing assembly station. Any substrate mounting plate such as 42 in the chuck 41 is removed and utilized with respect to a next selected substrate for alignment purposes. The first mounting plate 20 after positioning in the second holding chuck 41 will then assure that the substrate adhering to its top surface is precisely aligned for proper scribing by the laser beam generating apparatus within the housing 14 of FIG. 1. The operator need then only initiate operation of the automatic equipment so that scribing of the substrate will commence.

During the scribing of the first substrate the operator will align the second selected substrate following the same steps as used for the first substrate. Since the first and second substrate holding plates are identical, they can be interchanged and thus the second substrate mounting plate 42 will be utilized in the first holding chuck 22 for aligning the next substrate. The alignment can be completed during the time of scribing of the first substrate so that there is no lost time during the scribing operations.

After the first substrate has been scribed, the operator simply removes the second substrate mounting plate 42 from the second holding chuck 41 and then by actuating the vacuum release button 46 as described in FIG. 5, the substrate itself may be removed. This substrate is then inspected and then placed aside and the newly aligned substrate and substrate mounting plate are then moved from the first mounting chuck 22 to the second chuck 41 and scribing again commenced. The next substrate is then selected from the stack and the process simply repeated, a substrate being aligned during the time period that the preceeding substrate is being scribed.

Thus it will be evident that by the simple expediancy of providing identical first and second holding chucks and first and second substrate mounting plates and by positioning an alignment station next to the scribing assembly station, the scribing of a stack of wafers can proceed by a single operator at a greatly increased rate.

While a specific kinematic type mounting means has been shown, equivalent type mounting means could be employed. It is only essentially that the substrate mounting plate be precisely orientable in each of the particular chucks in order that the alignment of the substrate when the mounting plate is in one chuck will remain properly oriented when the mounting plate is transferred to the other chuck. Further, while disc type substrates have been illustrated, the apparatus of the invention is clearly applicable to substrates of a wide variety of materials and shapes.

It should be understood that in certain applications depending upon the type of substrate mechanical clamping or holding means could be used instead of the vacuum system described without departing from the broader aspects of the invention.

What is claimed is:

1. An apparatus for laser scribing a stack of substrates in rapid succession comprising: an alignment assembly station including a first holding chuck; a first substrate mounting plate receivable in a given orientation in said first holding chuck; an alignment microscope in a fixed position relative to said first holding chuck for viewing and aligning a substrate positioned on said first mounting plate relative to reference lines in said microscope; securing means for holding said substrate in an adjusted position on said first substrate mounting plate after aligning the substrate; a scribing assembly station including a second holding chuck disposed adjacent to said first holding chuck and of the same configuration as said first holding chuck so as to hold said first mounting plate in said same given orientation it was held in said first holding chuck; means guiding said second holding chuck to a given initial set position; automatic laser beam scribing equipment having a predetermined relationship to said second holding chuck when in said set position so that when said first substrate mounting plate is transferred to said holding chuck, said substrate is correctly aligned for automatic scribing by said laser beam; and a second substrate mounting plate receivable in said first holding chuck in said given orientation for enabling another substrate to be aligned thereon during the period of time that said first substrate is being automatically scribed, whereby said first and second substrate mounting plates may be transferred between said first and second holding chucks to enable a single operator to scribe a stack of substrates in rapid succession, one substrate being aligned during the period that the preceeding substrate is being scribed.

2. An apparatus according to claim 1, in which said first substrate mounting plate has on its underside three engaging points defining the vertices of a triangle, said first holding chuck including a kinematic mounting means comprised of a one point contact for a first one of said points; a two point contact for a second one of said points; and a three point contact for the third of said points, said kinematic mount assuring exact orientation of said substrate mounting plate on said first holding chuck so that repeatable positioning is assured, said second substrate mounting plate and second holding chuck including identical kinematic mounting means.

3. An apparatus according to claim 2, in which said securing means is effected by vacuum sealing and in which said three engaging points constitute three rounded projections, said one point contact comprising a flat disc at a given level, said two point contact comprising a pair of parallel members, and said three point contact comprising three members disposed at the vertices of an equilateral triangle, said first substrate mounting plate also including at least one indexing pin adjacent to an edge and said first holding chuck also including an indexing hole receiving said pin when said first substrate holding plate is substantially oriented.

4. An apparatus according to claim 3, in which each of the first and second substrate mounting plates includes a hole passing from its underside to its top surface upon which a substrate is received, said vacuum sealing means communicating a reduced pressure through said hole to the underside of a substrate when said substrate mounting plate is received in the holding chuck; a check valve in said hole so that a vacuum is maintained while transferring the substrate mounting plate from said first holding chuck to said second holding chuck; and a vacuum release valve manually operable to permit removal of a substrate after scribing preparatory to receiving a next substrate.

* * * * *